(12) United States Patent
Kim (10) Patent No.: US 10,288,172 B2
(45) Date of Patent: May 14, 2019

(54) MOTION DEMONSTRATION ELECTRONIC GEAR SHIFT APPARATUS AND METHOD OF CONTROLLING THE SAME

(71) Applicant: Hyundai Motor Company, Seoul (KR)

(72) Inventor: Eun-Sik Kim, Gwangmyeong-si (KR)

(73) Assignee: Hyundai Motor Company, Seoul (KR)

(*) Notice: Subject to any disclaimer, the term of this patent is extended or adjusted under 35 U.S.C. 154(b) by 720 days.

(21) Appl. No.: 14/935,772

(22) Filed: Nov. 9, 2015

(65) Prior Publication Data

US 2016/0131247 A1 May 12, 2016

(30) Foreign Application Priority Data

Nov. 11, 2014 (KR) .................. 10-2014-0155899

(51) Int. Cl.

| F16H 63/42 | (2006.01) |
| F16H 59/58 | (2006.01) |
| F16H 59/08 | (2006.01) |
| F16H 61/08 | (2006.01) |
| B60K 20/08 | (2006.01) |
| B60K 35/00 | (2006.01) |
| B60K 37/06 | (2006.01) |

(52) U.S. Cl.
CPC ............ *F16H 63/42* (2013.01); *B60K 20/08* (2013.01); *B60K 35/00* (2013.01); *B60K 37/06* (2013.01); *F16H 59/08* (2013.01); *F16H 59/58* (2013.01); *F16H 61/08* (2013.01); *B60K 2350/1024* (2013.01); *F16H 2059/081* (2013.01); *F16H 2063/423* (2013.01)

(58) Field of Classification Search
CPC .......... F16H 59/08; F16H 59/58; F16H 61/08; F16H 63/42; B60K 20/00; B60K 20/08
USPC ................ 74/335, 473.3; 116/28.1; 340/456; 701/64
See application file for complete search history.

(56) References Cited

U.S. PATENT DOCUMENTS

| 4,782,782 A | * | 11/1988 | Nill ......................... F16H 63/42 |
| | | | 116/28 R |
| 4,800,360 A | * | 1/1989 | Dunkley ............... B60W 10/06 |
| | | | 340/441 |
| 5,161,422 A | * | 11/1992 | Suman ................... B60K 20/04 |
| | | | 180/315 |

(Continued)

FOREIGN PATENT DOCUMENTS

| JP | 2006-177401 A | 7/2006 |
| KR | 10-0380869 B1 | 4/2003 |

(Continued)

*Primary Examiner* — William C Joyce
(74) *Attorney, Agent, or Firm* — Morgan, Lewis & Bockius LLP (57) ABSTRACT

A motion demonstration electronic gear shift apparatus may include a motion demonstration device having a gear shift stage selection device configured to change a gear shift stage of a vehicle, and movably mounted in the vehicle, a controller configured to recognize an operation of the gear shift stage selection device to move the motion demonstration device, and to transmit a signal generated by the gear shift stage selection device to a transmission control unit (TCU) of the vehicle to change the gear shift stage, and a movable device configured to move the motion demonstration device forward and rearward by receiving a signal from the controller.

2 Claims, 6 Drawing Sheets

(56) References Cited

U.S. PATENT DOCUMENTS

| | | | | |
|---|---|---|---|---|
| 6,487,484 | B1* | 11/2002 | Shober | F16H 59/12 |
| | | | | 477/125 |
| 6,774,780 | B1* | 8/2004 | Neubecker | F16H 63/42 |
| | | | | 200/61.85 |
| 7,219,001 | B2* | 5/2007 | Donar | F16H 63/42 |
| | | | | 340/456 |
| 2009/0222181 | A1* | 9/2009 | Lindgren | F16H 59/0204 |
| | | | | 701/64 |
| 2016/0245402 | A1* | 8/2016 | Fribus | B60R 25/252 |

FOREIGN PATENT DOCUMENTS

| | | |
|---|---|---|
| KR | 10-1349404 B1 | 1/2014 |
| WO | WO 2007/034567 A1 | 3/2007 |

\* cited by examiner

MOTION DEMONSTRATION ELECTRONIC GEAR SHIFT APPARATUS AND METHOD OF CONTROLLING THE SAME

CROSS-REFERENCE TO RELATED APPLICATIONS

The present application claims priority to Korean Patent Application No. 10-2014-0155899, filed Nov. 11, 2014, the entire contents of which is incorporated herein for all purposes by this reference.

BACKGROUND OF THE INVENTION

Field of the Invention

The present invention relates to an electronic gear shift apparatus for a vehicle and a method of controlling the same, and more particularly, to a motion demonstration electronic gear shift apparatus, which is configured such that when a gear shift stage is changed to a traveling-stage (R-stage/D-stage) of a vehicle, a motion demonstration device is moved first, and then a gear shift operation is carried out, after demonstration is completed, to allow a driver to predict a direction in which the vehicle travels, thereby preventing an erroneous gear shift manipulation, and a method of controlling the same.

Description of Related Art

In general, a transmission refers to an apparatus that changes rotational force and speed of power generated by an engine to produce rotational force and speed appropriate to a traveling situation of a vehicle, and transmits the rotational force and speed to driving wheels, and the transmission is classified into a manual transmission or an automatic transmission.

A driver, who drives the vehicle, may change a gear shift stage of the manual transmission or the automatic transmission to a desired gear shift stage by manipulating a gear shift lever mounted on a console surface at the periphery of a driver seat or mounted on a steering wheel.

The manual transmission is operated such that when the driver selects a gear suitable for a traveling state of the vehicle using the gear shift lever, motion desired by the driver is transmitted to the transmission through a cable or a rod, and the automatic transmission is operated such that when the driver moves the gear shift lever, an inhibitor switch is operated through a cable, and motion desired by the driver is transmitted to the transmission.

Particularly, recently, instead of a mechanical gear shift lever, the use of an electronic gear shift lever, in which a mechanical connecting structure between the transmission and the gear shift lever is substituted by an electrical connecting structure using an actuator and an ECU, is increased.

Unlike the mechanical gear shift lever, the electronic gear shift lever has drawbacks in that the electronic gear shift lever has no mechanical cable connecting structure and a position sensor unit needs to be provided to convert the driver's intention to change the gear shift stage into an electronic signal, but has advantages that lever operating force or manipulation properties are excellent and the manipulation thereof may be conveniently carried out.

The type of electronic gear shift lever includes a lever type electronic gear shift lever in which an electronic gear shift lever, which protrudes from the console surface of the vehicle, is manipulated forward and rearward, a dial type electronic gear shift lever in which a cylindrical electronic gear shift lever mounted on the console surface of the vehicle is manipulated by being rotated leftward and rightward, a column type electronic gear shift lever in which an electronic gear shift lever mounted at a lateral side of a steering wheel of the vehicle is manipulated upward and downward, and a button type electronic gear shift lever in which buttons, which displays the gear shift stages of the vehicle, are manipulated by being pushed.

However, the electronic gear shift lever in the related art has problems in that when the gear shift stage is changed, just a simple beep is generated at an R-stage regardless of the type of electronic gear shift lever, and there is almost no means for warning an erroneous gear shift manipulation of the driver.

Particularly, inexperienced drivers make the mistake of getting out of the vehicle after changing the gear shift stage of the vehicle to a traveling-stage (Reverse (R)-stage/Drive (D)-stage) instead of a stop-stage (Park (P)-stage/Neutral (N)-stage), or changing the gear shift stage of the vehicle, which needs to be changed to a D-stage, to an R-stage, because of being easily confused at the time of a minor collision or at the time of parking the vehicle, whereby collateral accidents often occur.

Therefore, there is a need for an electronic gear shift lever that may allow the driver to assuredly recognize the gear shift signal, and to predict the motion of the vehicle, but almost no research or development of the electronic gear shift lever has been conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a motion demonstration electronic gear shift apparatus and a method of controlling the same, which may allow a driver to immediately recognize a selected gear shift stage after a gear shift lever is manipulated, thereby significantly reducing a risk of an accident caused by an erroneous gear shift manipulation.

According to various aspects of the present invention, a motion demonstration electronic gear shift apparatus may include a motion demonstration device having a gear shift stage selection device configured to change a gear shift stage of a vehicle, and movably mounted in the vehicle, a controller configured to recognize an operation of the gear shift stage selection device to move the motion demonstration device, and to transmit a signal generated by the gear shift stage selection device to a transmission control unit (TCU) of the vehicle to change the gear shift stage, and a movable device configured to move the motion demonstration device forward and rearward by receiving a signal from the controller, in which when a traveling-stage (Reverse (R)-stage/Drive (D)-stage) is operated by the gear shift stage selection device, the motion demonstration device is moved first by the movable device, and after a predetermined time has passed, a signal generated by the gear shift stage selection device is transmitted to the TCU such that the gear shift stage of the vehicle may be changed.

The motion demonstration device may include a housing movably mounted on a console surface of the vehicle and having a space therein, a first bracket coupled at an upper side in the housing and supporting the gear shift stage selection device and the controller, and a second bracket coupled at a lower side in the housing and connected with the movable device to allow the housing to move.

The motion demonstration electronic gear shift apparatus may further include a rotary guide integrally coupled to a lower portion of the movable device, and a rotary motor connected to a lower end of the rotary guide and configured to rotate the rotary guide, in which the housing may be rotated overall in accordance with the rotation of the rotary guide.

According to various aspects of the present invention, a method of controlling a motion demonstration electronic gear shift apparatus may include recognizing, by a controller, an operation of a traveling-stage (R-stage/D-stage) among gear shift stages of a vehicle, moving a motion demonstration device forward or rearward by a signal transmitted from the controller, and transmitting, by the controller, a gear shift signal of the vehicle to a TCU and changing the gear shift stage of the vehicle, in which the changing of the gear shift stage of the vehicle may be carried out after a predetermined time has passed after the moving of the motion demonstration device.

The method may further include recognizing, by the controller, an operation of a stop-stage (P-stage/N-stage) among the gear shift stages of the vehicle, transmitting, by the controller, the gear shift signal of the vehicle to the TCU and changing the gear shift stage of the vehicle, and moving the motion demonstration device forward or rearward by the signal transmitted from the controller, in which the changing of the gear shift stage of the vehicle may be carried out at a same time as the recognizing of the operation of the stop-stage by the controller.

The method may further include recognizing, by the controller, an operation of a steering wheel installed in the vehicle, rotating a rotary motor coupled to a lower portion of the motion demonstration device, by a steering signal transmitted from the controller, and rotating the motion demonstration device clockwise or counterclockwise in accordance with the rotation of the rotary motor.

The motion demonstration device may be displayed on one of a cluster, a head up display (HUD), and an Audio, Video, Navigation (AVN) of the vehicle.

According to the present invention having the aforementioned configurations, when the traveling-stage (R-stage/D-stage) of the vehicle is operated, the motion demonstration device informs a traveling direction of the vehicle before the gear shift stage is changed, thereby significantly reducing a risk of an accident caused by an erroneous gear shift manipulation of the driver.

According to the present invention, the gear shift lever of the vehicle includes a housing, gear shift buttons, and the movable device which have comparatively simple structures, thereby greatly reducing production costs of the vehicle.

The present invention may demonstrate steering motion of the steering wheel using the rotary guide integrally coupled to the lower portion of the movable device and using the rotary motor, such that entertainment elements of the vehicle are greatly increased, thereby improving marketability of the vehicle.

The present invention demonstrates a situation immediately after the gear shift lever is manipulated, by means of tactile sensation, to the aged who cannot see an object within a short distance well or cannot hear sound well, or an inexperienced driver, thereby ensuring stability of a vehicle.

The present invention is implemented in conjunction with a risk recognition sensor of the vehicle such that in a dangerous situation, the motion demonstration device slightly vibrates forward and rearward, or the rotary motor slightly rotates while changing a direction thereof to provide a warning signal to the driver, thereby significantly reducing a risk of a vehicle safety accident.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
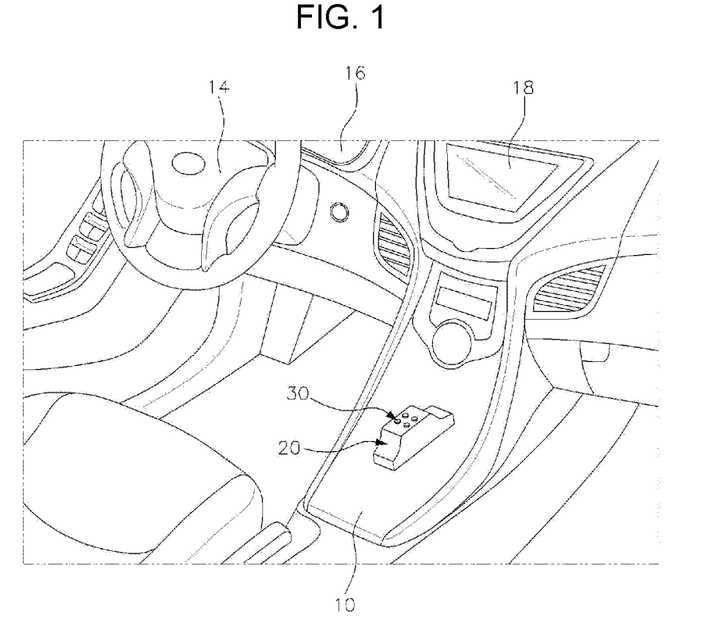
FIG. 1 is a schematic view illustrating an appearance of the interior of a vehicle in which an exemplary motion demonstration electronic gear shift apparatus according to the present invention is mounted.
Figure 2:
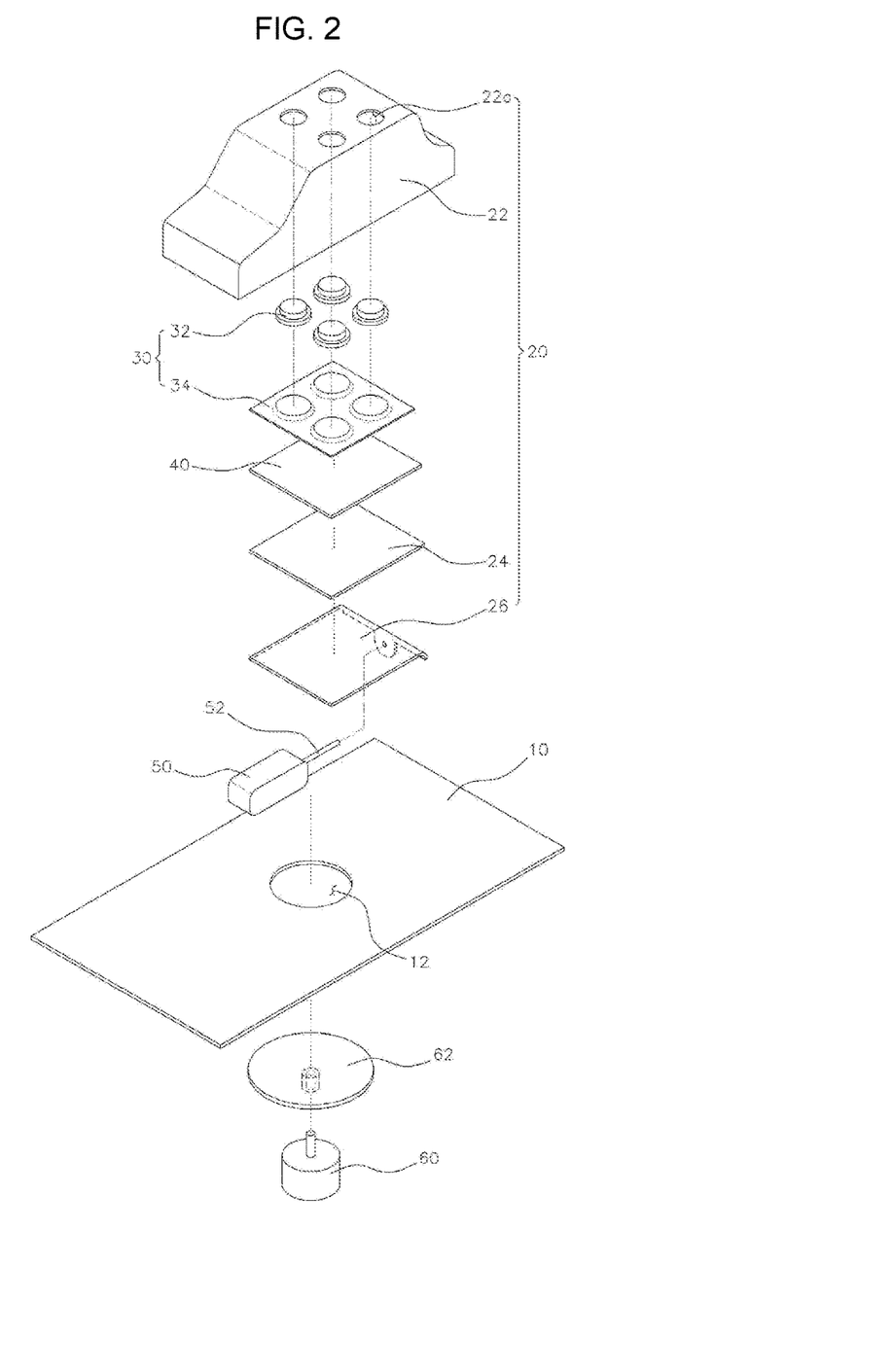
FIG. 2 is an exploded view of the exemplary motion demonstration electronic gear shift apparatus according to the present invention.
Figure 3:
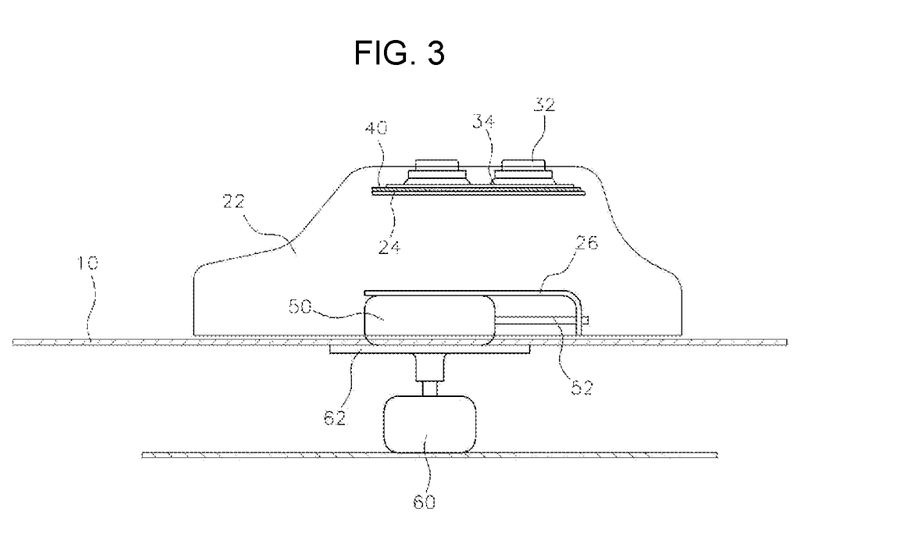
FIG. 3 is a side view of the exemplary motion demonstration electronic gear shift apparatus according to the present invention.

FIG. 1 is a schematic view illustrating an appearance of the interior of a vehicle in which a motion demonstration electronic gear shift apparatus according to various embodiments of the present invention is mounted, FIG. 2 is an exploded view of the motion demonstration electronic gear shift apparatus according to various embodiments of the present invention, and FIG. 3 is a side view of the motion demonstration electronic gear shift apparatus according to various embodiments of the present invention.

As illustrated in FIG. 1, a motion demonstration device 20 according to the present invention may be mechanically operated to be movable forward or rearward on a console surface 10 of a vehicle, or may be electronically operated by being displayed as a digital image on one of a cluster 16, a head up display (HUD), and an Audio, Video, and Navigation (AVN) 18 of the vehicle.

In a case in which the motion demonstration device 20 is mechanically operated, there are advantages that a driver may more intuitively recognize motion of the motion demonstration device and replacement and repair of the motion demonstration device may be simply carried out in comparison with the motion demonstration device that is electronically operated. Hereinafter, the motion demonstration device 20, which is mechanically operated, will be described.

As illustrated in FIG. 2, the motion demonstration device 20 may include a housing 22 which is movably mounted on a console surface 10 of the vehicle and has a space therein, a first bracket 24 which is coupled at an upper side in the housing 22 and supports a gear shift stage selection device 30 and a controller 40, and a second bracket 26 which is coupled at a lower side in the housing 22 and connected with a movable device 50 so as to allow the housing 22 to move.

As the illustrated various embodiments, a user may freely select and replace the housing 22 with a small-scale model of the vehicle purchased by the user or a small-scale model of the vehicle desired by the user, and the gear shift stage selection device 30 is installed at an upper side of the housing 22 so as for the user to change a gear shift stage of the vehicle.

The gear shift stage selection device 30 may be formed in various shapes such as a button type or a horizontal sliding type, and in the exemplary embodiment of the present invention, a button type gear shift stage selection device will be described.

As illustrated in FIG. 2, the gear shift stage selection device includes gear shift buttons 32 which are inserted into a plurality of through holes 22a formed at an upper end of the housing 22, and an elastic member 34 which is attached to lower portions of the gear shift buttons 32 and provides elastic force to the gear shift buttons 32.

A controller 40 is attached to a lower portion of the elastic member 34, and the controller 40 recognizes operations of the gear shift buttons 32 to move the motion demonstration device 20, and transmits a signal generated by the gear shift stage selection device 30 to a transmission control unit (TCU) of the vehicle to change the gear shift stage.

That is, when the driver pushes the gear shift button 32, the gear shift button 32, together with the elastic member 34, is pushed downward to generate a gear shift signal to be transmitted by the controller 40, and thereafter, when the driver releases the gear shift button 32, the gear shift button 32 returns to the original position thereof by elastic force of the elastic member 34.

The first bracket 24 is disposed at a lower side of the controller 40 to support the gear shift stage selection device 30 and the controller 40, and the second bracket 26 is bent in a '¬' shape at a lower side of the first bracket 24 and connected with a rod 52 of the movable device.

The movable device 50 serves to move the motion demonstration device 20 forward and rearward by receiving a signal from the controller 40, and may be variously formed as a solenoid, a rectilinear motor, a gear, a link, or the like.

As illustrated in FIGS. 2 and 3, a hollow portion 12 is formed in the console surface 10, the movable device 50 is integrally coupled to a rotary guide 62 disposed below the movable device 50 through the hollow portion 12, and a lower end of the rotary guide 62 is connected to a rotary motor 60.

The rotary motor 60 rotates the rotary guide 62 while rotating based on a steering signal from a steering wheel 14 illustrated in FIG. 1, and the motion demonstration device 20 including the housing 22 is rotated overall clockwise or counterclockwise in accordance with the rotation of the rotary guide 62.

A method of controlling the aforementioned motion demonstration electronic gear shift apparatus according to various embodiments of the present invention will be described in detail below.

Figure 4:
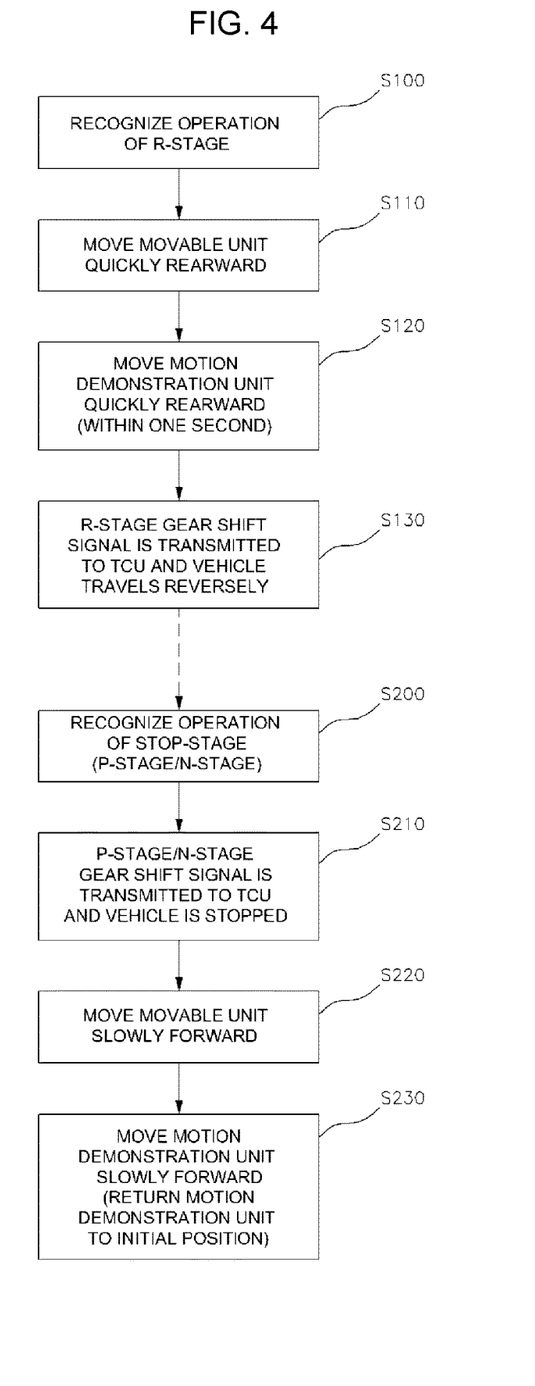
FIG. 4 is a flowchart illustrating a method of controlling the exemplary motion demonstration electronic gear shift apparatus according to the present invention when a driver operates a stop-stage (P-stage/N-stage) after operating an R-stage.
Figure 5:
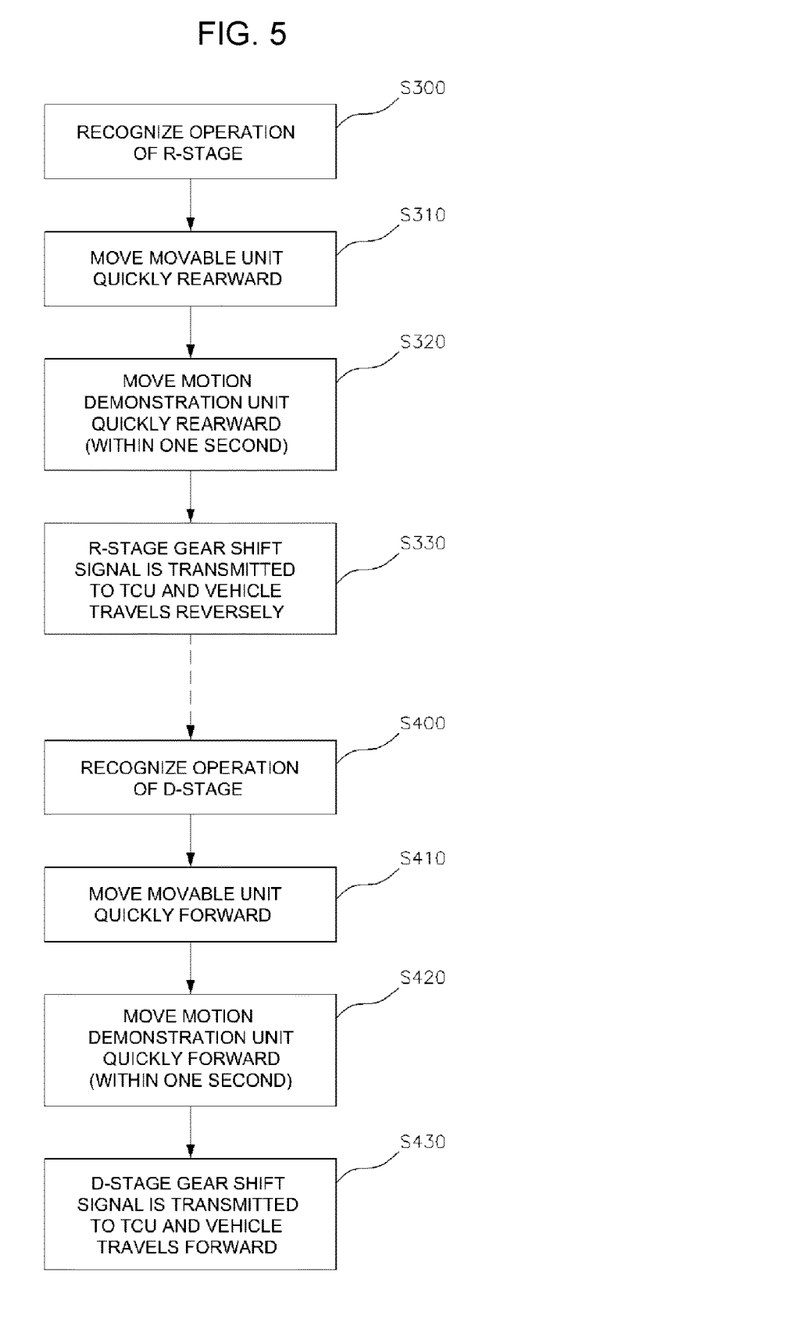
FIG. 5 is a flowchart illustrating a method of controlling the exemplary motion demonstration electronic gear shift apparatus according to the present invention when the driver operates a D-stage after operating the R-stage.

FIG. 4 is a flowchart illustrating a method of controlling the motion demonstration electronic gear shift apparatus according to various embodiments of the present invention when a driver operates a stop-stage (P-stage/N-stage) after operating an R-stage, and FIG. 5 is a flowchart illustrating a method of controlling the motion demonstration electronic gear shift apparatus according to various embodiments of the present invention when the driver operates a D-stage after operating the R-stage.

As illustrated in FIG. 4, when an R-stage among the gear shift stages of the vehicle is operated, the controller recognizes the operation of the R-stage first, and transmits information about the R-stage to the movable device (S100).

Therefore, the rod of the movable device is quickly moved rearward (S110), and the motion demonstration device connected with the movable device is quickly moved rearward (S120). In this case, the rearward movement of the motion demonstration device may be carried out within one second.

After the motion demonstration device is moved (S120), an R-stage gear shift signal of the vehicle is transmitted to the TCU by the controller, and the gear shift stage of the vehicle is changed to the R-stage, such that the vehicle travels reversely (S130).

In this case, step S130 of changing the gear shift stage of the vehicle to the R-stage may be carried out after a predetermined time has passed after step S120 of moving the motion demonstration device rearward, the demonstration for a predetermined time allows the driver to perfectly recognize the motion of the motion demonstration device and prevents the driver from erroneously changing the gear shift stage.

When the driver operates a stop-stage (P-stage/N-stage) of the vehicle after the driver stops driving the vehicle, the controller recognizes the operation of the stop-stage first, and transmits information about the stop-stage to the movable device (S200). A P-stage/N-stage gear shift signal recognized by the controller is transmitted to the TCU, and the gear shift stage of the vehicle is changed to the P-stage/N-stage, such that the vehicle is stopped (S210).

In this case, step S210 of changing the gear shift stage of the vehicle to the P-stage/N-stage may be carried out at nearly the same time with or immediately after step S200 of recognizing the operation of the stop-stage (P-stage/N-stage) by the controller.

The reason is that the change of the gear shift stage to the stop-stage (P-stage/N-stage) causes relatively and almost no erroneous gear shift manipulation accident, and in the case of the stop-stage, immediate response is required when the driver operates the stop-stage at the desired time.

After the gear shift stage of the vehicle is changed to the P-stage/N-stage (S210), the rod of the movable device is slowly moved forward (S220), and the motion demonstration device connected with the movable device slowly moves forward and returns to an initial position (S230).

If the driver operates a D-stage among the gear shift stages of the vehicle, the motion demonstration electronic gear shift apparatus according to the present invention is controlled through a process exactly reverse to the aforementioned method of controlling the R-stage.

That is, when the D-stage is operated, the motion demonstration device quickly moves forward, and thereafter, a D-stage gear shift signal is transmitted to the TCU, such that the vehicle travels forward. Then, when the stop-stage (P-stage/N-stage) is operated, a P-stage/N-stage gear shift signal is transmitted to the TCU, such that the vehicle is stopped, and thereafter, the motion demonstration device slowly moves rearward and returns to the initial position.

Figure 6:
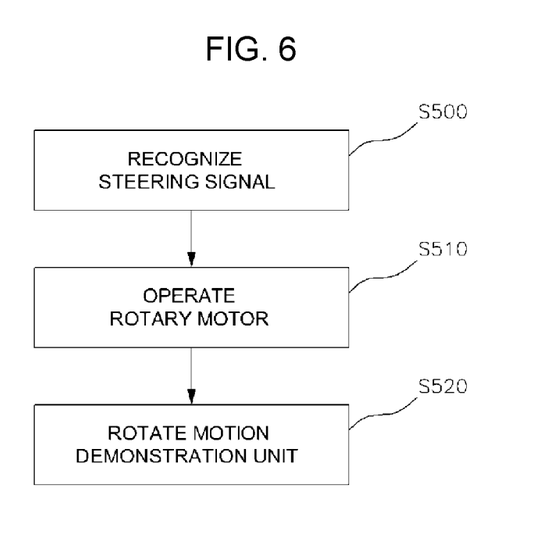
FIG. 6 is a flowchart illustrating a method of controlling the exemplary motion demonstration electronic gear shift apparatus according to the present invention.

As illustrated in FIG. 6, when the driver operates the D-stage after operating the R-stage among the gear shift stages of the vehicle, the motion demonstration electronic gear shift apparatus is controlled in accordance with the method of controlling the R-stage as described above, and then controlled in accordance with a method of controlling the D-stage.

That is, the controller 40 recognizes the operation of the R-stage among the gear shift stages of the vehicle first, and transmits information of the R-stage to the movable device (S300), and the rod of the movable device is quickly moved rearward (S310), such that the motion demonstration device connected with the movable device quickly moves rearward (S320).

Next, after a predetermined time has passed, an R-stage gear shift signal of the vehicle is transmitted to the TCU by the controller 40, such that the vehicle travels reversely (S330).

After the reverse traveling of the vehicle is completed by the driver, when the D-stage among the gear shift stages of the vehicle is operated, the controller 40 recognizes the operation of the D-stage and transmits information about the D-stage to the movable device (S400), and the rod of the movable device is quickly moved forward (S410), such that the motion demonstration device connected with the movable device quickly moves forward (S420).

Next, like the operation of the R-stage, a D-stage gear shift signal recognized by the controller 40 is transmitted to the TCU after a predetermined time has passed, and the gear shift stage of the vehicle is changed to the D-stage, such that the vehicle travels forward (S430).

Therefore, even though the driver erroneously changes the gear shift stage by any chance, the driver may directly feel the traveling direction of the vehicle with the hand, and may quickly perform a subsequent manipulation such as a manipulation of immediately pressing a brake pedal or changing the gear shift stage to other stages.

FIG. 6 is a flowchart illustrating a method of controlling the motion demonstration electronic gear shift apparatus according to various embodiments of the present invention.

The motion demonstration electronic gear shift apparatus according to various embodiments of the present invention may be operated in conjunction with a steering operation of the steering wheel 14 of the vehicle, and may perfectly show traveling motion of the vehicle to the driver at the gear shift lever.

As illustrated in FIG. 6, when a steering operation of the steering wheel 14 installed in the vehicle is carried out, a signal is generated by a sensor mounted in motor-driven power steering (MDPS), and the controller 40 recognizes the signal (S500).

The steering signal recognized by the controller 40 is transmitted to the rotary motor coupled to the lower portion of the motion demonstration device such that the rotary motor is operated (S510), and as a result, the motion demonstration device is rotated clockwise or counterclockwise (S520).

Therefore, when the driver turns the vehicle to the right while the driver drives the vehicle, the motion demonstration device is also rotated clockwise, and when the driver turns the vehicle to the left, the motion demonstration device is also rotated counterclockwise, such that the driver may clearly recognize the current rotation direction of the vehicle.

In this case, the rotary motor may rotate the motion demonstration device by rotating immediately after the controller recognizes the steering signal because the driver may be confused at the time of manipulating the steering wheel if the steering signal is delayed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A motion demonstration electronic gear shift apparatus comprising:
   a motion demonstration device having a gear shift stage selection device configured to change a gear shift stage of a vehicle, and movably mounted in the vehicle;
   a controller configured to recognize an operation of the gear shift stage selection device to move the motion demonstration device, and to transmit a signal generated by the gear shift stage selection device to a transmission control unit of the vehicle to change the gear shift stage; and
   a movable device configured to move the motion demonstration device forward and rearward by receiving a signal from the controller,
   wherein when a traveling-stage (Reverse (R)-stage/Drive (D)-stage) is operated by the gear shift stage selection device, the motion demonstration device is moved first by the movable device, and after a predetermined time has passed, a signal generated by the gear shift stage selection device is transmitted to the transmission control unit such that the gear shift stage of the vehicle is changed, and wherein the motion demonstration device includes:
- a housing movably mounted on a console surface of the vehicle and having a space therein;
- a first bracket coupled at an upper side in the housing and supporting the gear shift stage selection device and the controller; and
- a second bracket coupled at a lower side in the housing and connected with the movable device to allow the housing to move.

2. The motion demonstration electronic gear shift apparatus of claim 1, further comprising:
- a rotary guide integrally coupled to a lower portion of the movable device; and
- a rotary motor connected to a lower end of the rotary guide and configured to rotate the rotary guide,
- wherein the housing is rotated overall in accordance with the rotation of the rotary guide.

* * * * *